US005260368A

United States Patent [19]

Benkhoucha et al.

[11] Patent Number: 5,260,368

[45] Date of Patent: Nov. 9, 1993

[54] MOTOR VEHICLE HEADLAMP REFLECTOR OF THERMOSETTING PLASTICS MATERIAL

[75] Inventors: Karim Benkhoucha, Paris; Salvatore Chitarra, Antony, both of France

[73] Assignee: Valeo Vision, Bobigny Cedex, France

[21] Appl. No.: 911,275

[22] Filed: Jul. 9, 1992

[30] Foreign Application Priority Data

Jul. 10, 1991 [FR] France ............................ 91 08696

[51] Int. Cl.[5] ............................ C08K 7/14

[52] U.S. Cl. ............................ 524/494; 523/204; 523/513; 523/514; 523/522; 523/527

[58] Field of Search ............... 523/513, 514, 522, 204, 523/527; 524/494

[56] References Cited

U.S. PATENT DOCUMENTS

| | | | |
|---|---|---|---|
| 3,882,078 | 5/1975 | Kubota | 523/522 |
| 4,080,354 | 3/1978 | Kramer | 523/522 |
| 4,107,130 | 8/1978 | Gergen et al. | 523/522 |
| 4,160,759 | 7/1979 | Gardner et al. | 523/522 |

FOREIGN PATENT DOCUMENTS

| | | |
|---|---|---|
| 0184554 | 9/1988 | European Pat. Off. . |
| 1-203458 | 8/1989 | Japan . |
| 1461267 | 3/1977 | United Kingdom . |

*Primary Examiner*—Veronica P. Hoke

[57] ABSTRACT

A motor vehicle headlamp reflector is of a thermosetting plastics material. The reinforcing material constitutes a proportion by weight of 10% to 25% of the total weight of the material, the reinforcing material comprising 50% to 95% by weight of fibrous material such as glass fibre, together with 5% to 50% by weight of wollastonite. The proportions are preferably 60% to 70% glass fibre and 30% to 40% wollastonite.

6 Claims, No Drawings

MOTOR VEHICLE HEADLAMP REFLECTOR OF THERMOSETTING PLASTICS MATERIAL

FIELD OF THE INVENTION

The present invention relates to a reflector made of thermosetting plastics material, more particularly for use in a headlamp for a motor vehicle.

BACKGROUND OF THE INVENTION

A motor vehicle headlamp essentially comprises a lamp which is located at the focal centre of a concave reflector so as to emit a particular light beam satisfying safety requirements. The reflector has to have a reflective surface of particularly high quality, so as to ensure that the reflected beam is properly distributed, without faults or irregularities which might give rise to parasitic reflections that could cause dazzle. At the same time, for reasons of cost and in order that the reflector can be made in shapes which are becoming more and more complex, these reflectors are currently made of plastics material.

Thermoplastic materials facilitate moulding which is easily controllable, and are found to be generally satisfactory in that their surface quality is compatible with the required optical function. However, these thermoplastic materials have the drawback that they are sensitive to heating caused by the lamp itself when the headlamp is illuminated. This disadvantage manifests itself in the appearance of local deformations which affect the quality of the reflected light beam. The smaller the volume of the reflector, the more apparent is this undesirable effect.

Better resistance to heating can be obtained from thermosetting plastics materials. The compositions which are used essentially comprise: a resin with an unsaturated polyester base; an agent for preventing shrinkage, such as a thermoplastic composition; and glass fibres which act as reinforcing material.

The appropriate proportions of the various constituents have been determined experimentally in such a way that a surface quality free of asperities or fissures (i.e. a surface of optical quality) is able to be made by injection moulding so that the reflectors are suitable for use in motor vehicle headlamps. It has been established that any departure, however small, from these appropriate dimensions is detrimental to the properties of the material of the reflector, as regards the surface quality and/or mechanical strength and chemical and mechanical stability of the reflector.

However, even when using the appropriate proportions of the various constituents, it has been noticed that moulding of small reflectors does not give satisfactory results. In particular, these small reflectors tend to have very prominent local angular profiles in certain places. Various moulding faults have been found in the parts of the reflector where these angular profiles occur. These faults include, for example, heterogeneous distribution of the reinforcing fibres: this gives rise to mechanical weakness under the effect of mechanical and/or thermal shock.

DISCUSSION OF THE INVENTION

An object of the present invention is to provide a reflector, in particular for a motor vehicle headlamp, which is made of thermosetting plastic material but which does not have the above mentioned drawbacks.

According to the invention, such a reflector is characterised in that the said thermo-setting material includes reinforcing material in a proportion by weight of 10 to 25% with respect to the total mass of the said material, and in that the said reinforcing material comprises from 50% to 95% by weight of fibrous material, for example (and more particularly) glass fibres, and from 5% to 50% by weight of wollastonite. Wollastonite is a calcium metasilicate in an acicular form.

Preferably, the said reinforcing material comprises from 60% to 70% of glass fibres and from 30% to 40% of wollastonite.

Especially satisfactory results are found to be obtained with a reflector in accordance with the invention in which the wollastonite has a particle size in the region of 10 microns, having been subjected to a sealing treatment by means of a silane composition.

The thermosetting material of a reflector in accordance with the invention therefore comprises:

- an unsaturated polyester resin;
- a monomer, for example a styrene;
- an agent for preventing shrinkage, which preferably consists of a mixture of a thermoplastic material and an elastomer;
- powder filler, for example calcium carbonate;
- a mixture of fibrous materials, and more particularly glass fibres and wollastonite, in the proportions discussed above; and
- other components, for example a catalyst and a stripping agent. In the shrinkage prevention agent, the thermoplastic material preferably comprises polypropylene adipate, and the elastomer is preferably of the SEBS type, i.e. an elastomer having the sequence styrene-ethylene-butadiene-styrene.

Tests carried out by the company which is the Applicant in the French patent application for this invention, corresponding to the present application, have shown that, in the relative proportions discussed above, replacement of part of the fibre material by wollastonite enables an overall improvement to be obtained in regard to both bending modulus and resistance of the material to rupture. This effect presents an unexpected synergy effect.

Headlamp reflectors, including those of small size, made in accordance with the present invention, are also found to have improved surface quality, in particular in the optically active zones of the reflectors. In addition, it has been observed that the presence of wollastonite in the proportions prescribed according to the invention leads to homogeneous distribution of the fibrous material during injection moulding, even in sharply angled zones, thus retaining the required characteristics of homogeneous mechanical and thermal strength.

Further features and advantages of the invention will appear more clearly from the following description, given by way of example only, in which preferred embodiments of the invention are disclosed with comparative examples.

DESCRIPTION OF PREFERRED EMBODIMENTS OF THE INVENTION

EXAMPLE 1

A mixture No. 1 is made in the following composition by weight, expressed in percentages:

(a) 20% of unsaturated polyester resin of the maleic type which is commercially available under the reference "MO003" from the company known as Cray Valley, together with styrene.

(b) 10% of an agent for preventing shrinkage, comprising a thermoplastic component such as a saturated polyester, together with an elastomer of the styrene-ethylene-butadiene-styrene (SEBS) type.

(c) 55% of a powder filler comprising calcium carbonate, together with suitable additives such as a catalyst and a stripping agent.

(d) 15% of reinforcing material comprising glass fibres having a mean length of 4.5 mm and a mean diameter of 10 microns.

EXAMPLE 2

A mixture No. 2 is made using the same constituents (a), (b) and (c) above, in the same proportions as in mixture No. 1. However, in the present example the reinforcing material comprises, expressed in percentages with respect to the total weight of the mixture, the following:

11.3% of glass fibres of the same kind as those in mixture No. 1;

3.7% of wollastonite having a mean particle size of 10 microns, which has undergone a sealing treatment by means of a silane type composition of the kind commercially available under the reference "10UP" from the company known as Wicroll.

It will be noted that in this mixture the relative proportions by weight of glass fibres and wollastonite are respectively 75% and 25%.

EXAMPLE 3

In this example, a mixture No. 3 is the same as mixture No. 2, except that the relative proportions of glass fibres and wollastonite are modified to be 50% and 50% respectively. Thus the proportions by weight expressed with respect to the total weight of the mixture are 7.5% glass fibres and 7.5% wollastonite.

EXAMPLE 4

In this example, a mixture No. 4 is the same as mixture No. 2 except that the relative proportions of glass fibres and wollastonite are respectively 25% and 75%, corresponding to percentages by weight of 3.7% glass fibre and 11.3% wollastonite with respect to the total weight of the mixture.

EXAMPLE 5

In this example, a mixture No. 5 is identical to mixture No. 1, except that the glass fibre material is entirely replaced by wollastonite of the kind described above in Example 2, so that the reinforcing fibres consisting of this wollastonite therefore represent 15% by weight of the total weight of the mixture.

Various headlamp reflectors for motor vehicles, small in size and having pronounced angular shapes, are then formed by injection moulding, successively in the same mould, from the respective mixtures Nos. 1 to 5 described above.

It is found that ease of moulding increases progressively from mixture 1 to mixture 5, with a corresponding increase in the duration of flow into the mould under identical pressure and temperature conditions.

On removal from the mould, good results are obtained with mixtures 1 to 4. It has been observed, on repeating the above operation several times, that breakage occurs during ejection from the mould when mixture No. 5 is used.

The reflectors obtained from mixtures 1, 2 and 3 have an optical shape and a surface quality which is merely correct in the reflector made from mixture No. 1, but which is excellent when the reflector is made from mixtures 2 and 3. By contrast, the results obtained in these respects in reflectors made from mixtures 4 and 5 are respectively mediocre and poor.

As regards the mechanical characteristics of these reflectors, an unexpected and substantial improvement in the bending modulus and resistance to rupture stresses is observed when using mixtures 2 and 3. The same effect is also observed with mixture 4, though to a lesser extent.

It follows that, particularly with mixtures 2 and 3, a synergy effect between the fibrous material and the wollastonite is apparent. It is thought that this is due to an isotropic effect of the wollastonite, the particle size of which is selected so as to be identical to the thickness of the glass fibres, not only by virtue of the fact that the wollastonite occurs naturally in an acicular or needle-like form, but also because it enables a more homogeneous distribution of the fibrous materials to be obtained in the moulding operation, leading to a moulded product of improved quality and strength.

Further series of experiments and tests have been carried out on reflectors formed from further mixtures, referred to as mixtures 1A to 5A and 1B to 5B. These derive respectively from the mixtures Nos. 1 to 5 described above, by modifying the amounts of the reinforcing materials so that the latter are equal to 10% in mixtures 1A to 5A and 25% in mixtures 1B to 5B, with the proportions of powder filler being modified in consequence. The relative proportions of fibrous material and wollastonite are the same as in Examples 1 to 5 respectively. The same results as in the reflectors obtained using the mixtures in Examples 1 to 5 were found to be also obtained for reflectors made from mixtures 1A to 5A, and from mixtures 1B to 5B. However, the best overall compromise appeared to be obtained with mixtures 1 to 5.

Complementary tests have been carried out which showed that the greatest improvement was obtained with mixtures similar to those described above, with the same total quantity of reinforcing materials, and in which the relative proportion of fibrous materials and wollastonite were respectively in the range between 60% and 70% and between 30% and 40%.

It has also been found that, for mixtures 2 and 3, as well as for intermediate mixtures corresponding to the above mentioned additional tests, improved surface quality was obtained by slightly increasing the proportion of shrinkage preventing agent, to a proportion lying in the range between 10.5% and 13% by weight of the total mixture, without in any way altering the thermal and mechanical strength of the resulting reflectors.

What is claimed is:

1. A reflector for a motor vehicle headlamp, made from thermosetting plastics material containing reinforcing materials in a proportion by weight of 10% to 25% with respect to the total mass of said plastics material, said reinforcing materials comprising from 50% to 95% by weight of glass fibre and from 5% to 50% by weight of wollastonite.

2. A reflector according to claim 1, wherein the said reinforcing materials comprise from 60% to 70% of glass fibres and from 30% to 40% of wollastonite.

3. A reflector according to claim 1, wherein the said wollastonite has a particle size in the region of 10 microns and has been subjected to a sealing treatment by means of a silane composition.

4. A reflector according to claim 1, wherein the said glass fibres have a mean length of 4.5 mm and a mean diameter of 10 microns.

5. A method of making a reflector according to claim 1, comprising the step of injection moulding the reflector in a composition comprising:

an unsaturated polyester resin;

a monomer;

an agent for preventing shrinkage, comprising a thermoplastic component together with an elastomer of the styrene-ethylene-butadiene-styrene type;

reinforcing materials comprising fibres of glass and calcium metasilicate;

powder filler;

a catalyst; and a stripping agent.

6. A method according to claim 5, wherein the proportion by weight of said agent for preventing shrinkage lies in the range between 10.5% and 13% by weight of the total composition.

* * * * *